Oct. 28, 1941.  B. J. DI SANTO  2,260,611

MATERIAL HANDLING MECHANISM

Filed Nov. 18, 1938  3 Sheets-Sheet 1

INVENTOR
Bartel J. DiSanto
BY
James T. Bent
ATTORNEY

Patented Oct. 28, 1941

2,260,611

UNITED STATES PATENT OFFICE 2,260,611

MATERIAL HANDLING MECHANISM

Bartel J. Di Santo, Woodbridge, N. J., assignor to American Smelting and Refining Company, New York, N. Y., a corporation of New Jersey Application November 18, 1938, Serial No. 241,105

5 Claims. (Cl. 77—63)

This invention relates to the handling of metal billets and provides apparatus which, though of particular importance in the cupping of copper billets preparatory to the production of copper tubing, may be employed in various operations.

In producing copper tubes by piercing copper billets, the billets are customarily bored or cupped at the ends in order to properly center the piercing tool.

Among other features, the present invention provides improved equipment for conveying successive billets to the cupping machine and firmly securing them in proper position during the boring or cupping operation, while automatically controlling the feeding of billets to the machine at predetermined time intervals.

Figure 1:
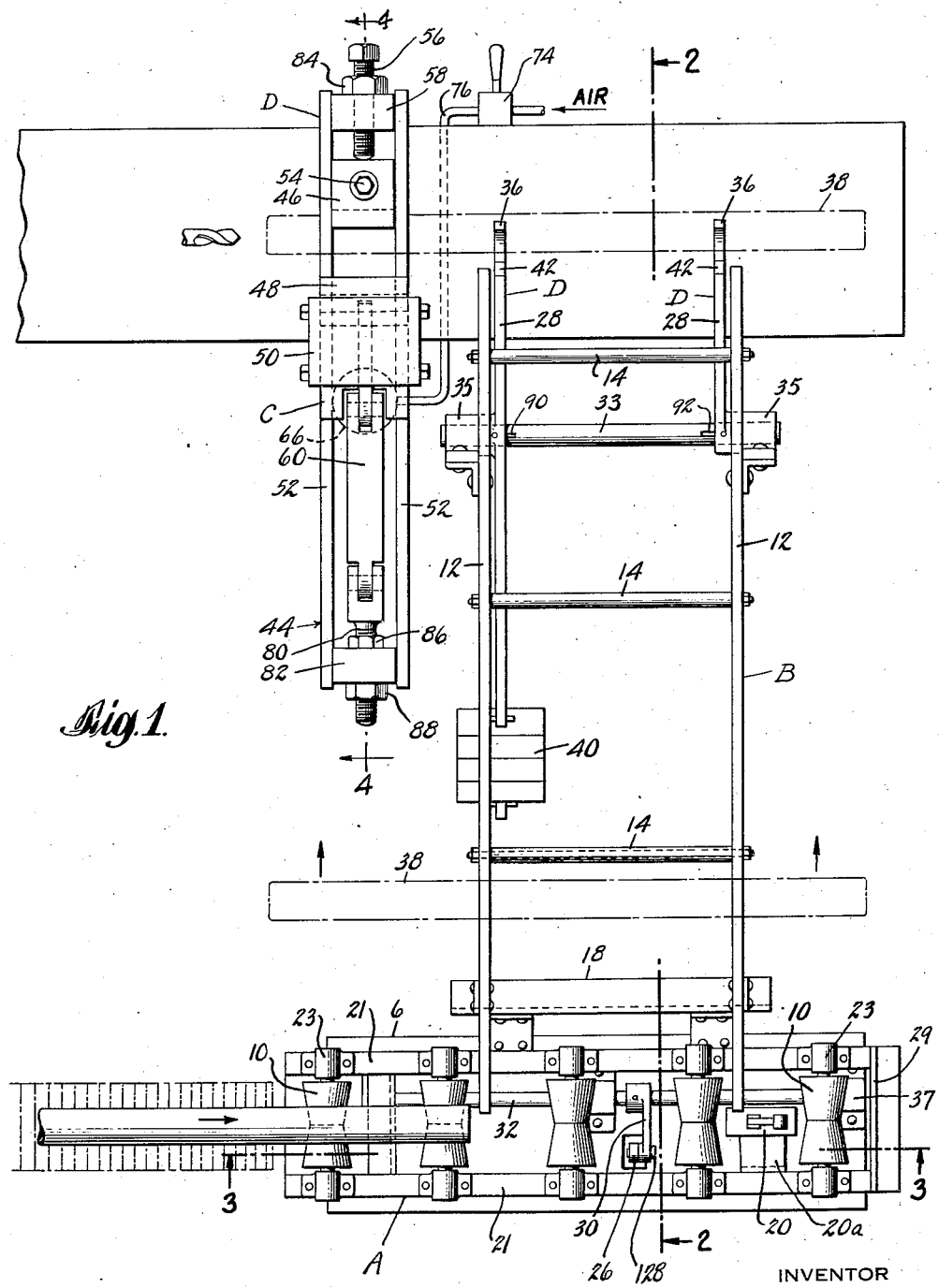
Figure 2:
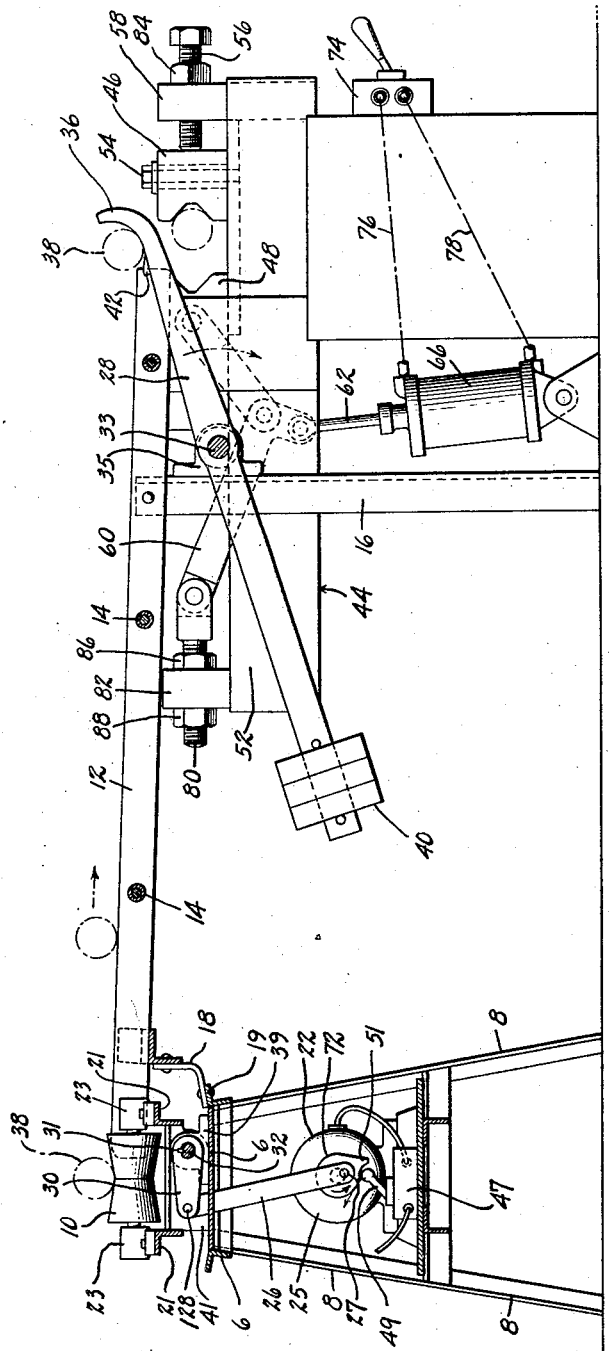
Figure 3:
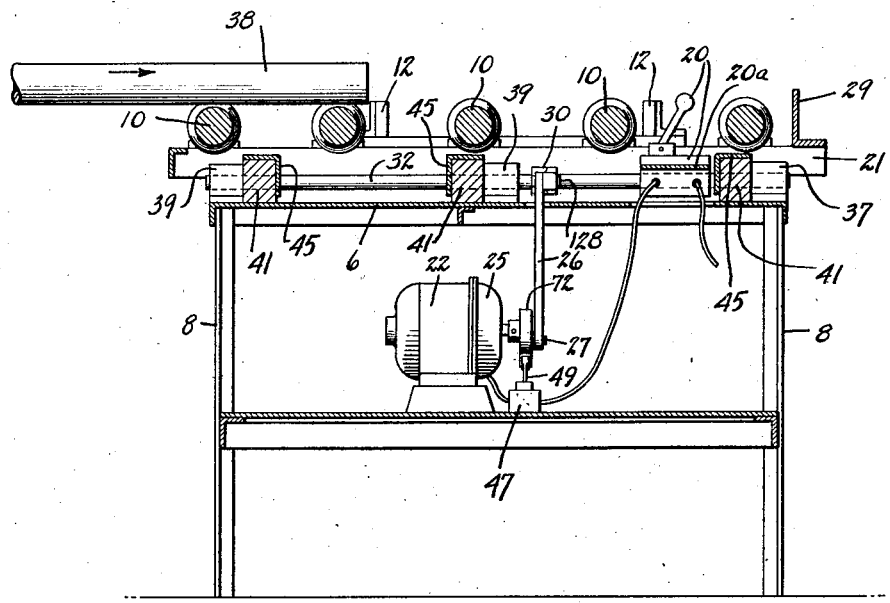
Figure 4:
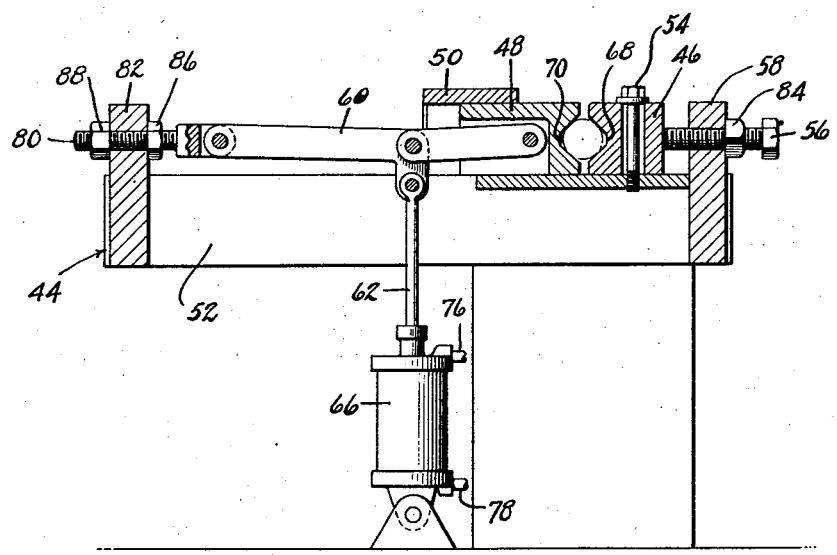

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 is a plan view of the present improved construction, certain parts being omitted for clarity of illustration, Fig. 2 is a section taken on the line 2—2 of Fig. 1, Fig. 3 is a section taken on the line 3—3 of Fig. 1, and Fig. 4 is a sectional view of the clamping device shown in Fig. 1, taken generally on the line 4—4 thereof and illustrating operating details of such device.

Referring more particularly to the drawings, the improved construction comprises conveying mechanism, a section of which is indicated at A, which is adapted to deliver billets or the like to a cross conveyor B, which discharges the billets onto suitable holding devices D which hold the billets in position to be clamped by clamping mechanism C positioned at one side of the holding devices, as will be apparent from the diagrammatic showing in Fig. 1, by means of which the billets are held firmly in position for cupping or boring operations.

The conveyor section A comprises the frame 6, which is mounted on suitable supports, indicated at 8, and which carries conveyor instrumentalities, such as idler rolls 10, along which the billets are conveyed by gravity, the billets moving lengthways along the conveyor rolls, the billets being transferred automatically to the cross-conveyor B by mechanism which will be described hereinafter.

The cross-conveyor B may be simply a pair of suitably spaced-apart rails 12, which receive the billets cross-ways of the rails and allow them to roll down into operative engagement with the clamping means, the rails 12 being held spaced apart by means of spacers 14, the cross-conveyor being mounted on supports 16, at approximately the end of the conveyor B remote from the conveyor A; the adjacent end of conveyor B being mounted on a Z-bar 18 secured to a side frame 19, connecting the end supports 8. Angles 21 serve as mountings for the bearings 23 for the conveyor rollers 10.

The body of the conveyor A is adapted for vertical tilting movement responsively to the billets reaching a predetermined position. To this end, and to effect an automatic transfer of the billets from the conveyor A to the conveyor B, there is provided a limit switch 20, which is mounted on a plate 20a, suitably welded to the frame angles 21, the switch 20 comprising a suitably mounted spring arm held normally in the path of travel of the billet.

The switch 20 is connected to a motor 22 through a relay box, the motor 22 operating, through a speed reducer 25, an arm 26 which is secured by a pin 128 to a link 30, this link being keyed at 31 to a shaft 32, which shaft extends longitudinally of the conveyor frame 6, and which is mounted in suitable bearings 37 and 39, which bearings are mounted, in turn, upon the end members of conveyor frame 6.

The angles 21 of the conveyor have secured to them, as by welding, plates 41, 41 which are keyed to the shaft 32, the plates of course being provided with suitable holes through which the shaft passes. The securing of the plates 41, 41 is facilitated by providing angles 45, 45, the ends of which are welded to the side angles 21 of the conveyor, and the sides of which are welded to the plates 41 along the length thereof. Consequently, the angles 21 are tied together securely, so that the entire top structure of the conveyor tilts vertically laterally upon the shaft 32 being turned responsively to actuation of the arm 26 by operation of the motor 22 when a billet 38 engages the limit switch 20 to depress its arm.

The actuation of the arm 26 is effected by means of an eccentric mounting 27, which is keyed to the motor shaft, rotation of the motor shaft consequently reciprocating the arm 26 in a vertical plane. Therefore, as the arm 26 asends, it lifts the conveyor angles 21 and the rollers 10 laterally, as shown in Fig. 2, until the billets roll off from the rollers 10 onto the arms 12 of the cross-conveyor B; and as the revolution of the shaft is completed, the conveyor is returned to its billet-receiving position. A stop or bumper plate 29 is provided for preventing the billets from running off from the end of the conveyor A.

In order to stop the motor 22, there is provided a second limit switch 47 which includes a switch arm 49 which is adapted to be engaged by a suitable contact cam 51 which is keyed to the motor shaft, and which is adapted to trip the switch arm 49 to actuate the switch 47 for stopping the motor 22 responsively to the arm 26 reaching its low position at the end of each revolution of the motor shaft 27. Switches 20 and 47 are electrically interconnected in known manner, as through the relay box aforesaid, so that closing the former automatically closes the latter.

The arms 28 which receive the billets from the conveyor A and the cross-conveyor B, are fixed to rotate with a shaft 33, which, in turn, may be mounted conveniently in suitable bearings 35 on the supports 16. The arms 28 are upturned as is indicated at 36 to form stops for the billets, one of which is indicated at 38. Also, one of the arms 28 is extended sufficiently to receive a counterweight 40, this counterweight being sufficiently heavy to hold normally the arms 28 in raised position, as shown in Fig. 2, the counterweight however being less in weight than the weight of the arms 28 with a billet thereon, whereby the ends 36 of arms 28 are caused to swing down into position to enable the billet to be received in the clamping mechanism C, the billet being held between the ends 36 and the upwardly projecting stop lugs 42, which the billet overrides through its momentum of travel down the rails 12, but which prevents displacement of the billet after it comes to rest against the upturned ends 36 of the arms 28.

This clamping mechanism C comprises a frame indicated generally at 44 on which are positioned cooperating clamping devices, one of which, designated at 46, is fixedly mounted, whereas the cooperating complemental member 48 is slidably mounted in a guide 50 and on the side rails 52 of the frame 44.

The stationary clamping member 46 is held rigidly by bolt 54 suitably anchored in the frame members 44 to allow for a certain amount of adjustment of the clamping member 46, and also by a screw 56 which is threaded in an upwardly extending end block 58 of the frame 44.

The movable block 48 is actuated by a toggle mechanism 60 which is operated by a piston rod 62 connected to a piston operating in a fluid-pressure cylinder 66, which fluid may be either a hydraulic fluid or compressed air. The cooperating blocks 46, 48 of the clamping mechanism are recessed as indicated at 68, 70 for receiving the billet therein.

From the foregoing description, it will be apparent how the system of the present invention operates. Each billet 38 as it travels along the conveyor section A engages the arm 20 of the limit switch, which is yieldably held in position in the path of the billets by suitable spring action. Engagement of the billet with the limit switch arm 20 depresses the said arm. This action starts the motor 22 which vertically tilts the conveyor A through operating the arm 26, this being eccentrically mounted on a disc 72 which is rotated by the motor 22, the billet being restrained on the conveyor A by the stop plate 29 until the conveyor rollers 10 have been tilted vertically and laterally sufficiently to allow the billet to roll off onto the arms 12, it then rolling down along these arms until it rolls onto the arms 28, which are held normally in elevated position, as shown in Fig. 2, by means of the counterweight 40.

As the billet passes onto the arms 28, it overcomes the action of the counterweight 40, and depresses the arms 28 until the billet is brought into position for clamping, the momentum of the billet carrying it past the abutments 42 and into contact with the upturned ends 36, where it becomes held between these upturned ends and the abutments 42. As the arms 28 assume their low position under action of the weight of the billet, the billet is brought into proper alignment with the clamping mechanism C to enable the billet to be gripped by the clamping jaws, which are in open position with the actuating toggle 60 in released position.

In order to effect this gripping, fluid pressure is introduced into the cylinder 66 by suitable actuation of the valve 74 which is provided to control the supply of fluid to the piston cylinder 66 for actuating the piston rod 62, thereby causing the toggle 60 to straighten and moving the clamping member 48 forwardly into clamping position. The fluid connections between the valve 74 and the cylinder 66 are indicated at 76 and 78, and a screw 80 is provided, desirably, behind the toggle 60 in order to effect any needed adjustment of the motion of the toggle and the clamping member 48. This screw is threaded through an end block 82 of the clamping machine frame. Suitable lock nuts, such as those designated by 84, 86 and 88 desirably are provided to maintain the screws 56 and 80 in their pre-selected adjusted positions. It may be noted that key-ways 90 and 92 may be provided on the shaft 33 for securing the arms 28 to the shaft.

What is claimed is:

1. Material handling mechanism comprising conveyor means along which articles being conveyed are adapted to travel, the said conveying means including a tiltable section, and mechanism automatically operable responsively to the said articles arriving at a predetermined station for actuating the conveyor section to tilt the same for effecting discharge of the said articles, the said mechanism including instrumentalities for tilting the conveying section from receiving position to discharging position, a motor for operating the said instrumentalities, a limit switch for starting the motor, the said switch including a switch arm actuatable by engagement therewith of an article moving along the conveyor, a second switch for stopping the motor, a contact arm operated by the motor for engaging said second switch responsively to the conveyor means returning from discharging position to conveying position to open the said switch, and connections between the switches for closing both switches upon engagement of the article being conveyed with the switch arm of the motor starting switch.

2. Material handling mechanism for conveying metal billets and the like comprising conveying instrumentalities along which billets being conveyed are adapted to travel, means enabling the said conveying instrumentalities to be tilted to effect discharge of the billets from the said conveying instrumentalities, the said means including a motor, lifting means including a lever system actuated by the motor, a limit switch for controlling the motor and operated by engagement of a billet with the switch as the billet moves on the conveying instrumentalities, a second switch for stopping the motor upon return of the conveyor instrumentalities from discharging position, a motor-operated contact for the second switch adapted to open the switch to stop the motor simultaneously with the conveying instrumentalities assuming conveying position, and connections between the said switches for producing simultaneous actuation of both switches.

3. Material handling mechanism for conveying metal billets and the like comprising a pivoted frame section supporting conveying instrumentalities along which billets being conveyed are adapted to travel, means enabling the said conveying instrumentalities to be tilted to effect discharge of the billets from the said conveying instrumentalities, the said means including a motor, lifting levers actuated by the motor and engaging a portion of the frame to lift one side of the frame around its pivot, a limit switch for starting the motor and operated by engagement of a billet with the switch as the billet moves on the conveying instrumentalities, a second switch for stopping the motor upon discharge of the billet from the conveyor, contact means operated by the motor for engaging the second switch to actuate the said switch for stopping the motor after a predetermined time interval of operation, and means for producing simultaneous actuation of both switches.

4. Material handling mechanism for metal billets and the like comprising conveying means along which billets being conveyed are adapted to travel, mechanism for actuating the conveying means to effect discharge of the billets therefrom, receiving instrumentalities for the billets including a second conveyor comprising a delivery frame for the billet, cooperating arms pivotally mounted on the frame, and being shiftable responsively to the weight of a billet received thereon from a billet-receiving to a billet-holding position, the said shiftable arms having billet-holding devices thereon for continuously retaining the billet in predetermined position when the instrumentalities are in billet-holding position, and clamping devices for securing the billets in the said predetermined position for machining operations on the billets.

5. Material handling mechanism for metal billets and the like comprising conveying means along which billets being conveyed are adapted to travel, mechanism for actuating the conveying means to effect discharge of the billets therefrom, receiving instrumentalities for the billets including a delivery conveyor for the billet, and a frame pivotally mounted on the delivery conveyor and shiftable responsively to the weight of a billet received thereon from a billet-receiving to a billet-holding position, the said frame being provided with billet-holding devices for continuously engaging and holding the billet in predetermined position when the frame is in depressed position, and clamping mechanism for securing the billets in the said predetermined position for machining operations on the billets, the said mechanism including clamping jaws positioned relatively to the said billet-holding devices to clamp a billet retained in position by the said devices, and fluid pressure actuated devices for operating the said clamping jaws.

BARTEL J. DI SANTO.